United States Patent [19]

Arimoto et al.

[11] Patent Number: 5,165,321
[45] Date of Patent: Nov. 24, 1992

[54] MAIN BEARING DEVICE FOR BENT AXIS TYPE AXIAL PISTON PUMP/MOTOR

[75] Inventors: Takeo Arimoto, Mie; Takashi Ogata; Kazuyoshi Nagahara, both of Kanagawa, all of Japan

[73] Assignee: Kabushiki Kaisha Komatsu Seisakusho, Japan

[21] Appl. No.: 457,796
[22] PCT Filed: May 19, 1989
[86] PCT No.: PCT/JP89/00502
  § 371 Date: Jan. 16, 1990
  § 102(e) Date: Jan. 16, 1990
[87] PCT Pub. No.: WO89/11593
  PCT Pub. Date: Nov. 30, 1989

[30] Foreign Application Priority Data

May 19, 1988 [JP] Japan ............... 63-65107

[51] Int. Cl.⁵ .................. F01B 13/04; F16C 19/38
[52] U.S. Cl. ........................ 91/499; 384/517
[58] Field of Search ............ 91/499, 486; 384/563, 384/517

[56] References Cited

U.S. PATENT DOCUMENTS

| | | | |
|---|---|---|---|
| 2,404,615 | 7/1946 | Boyd | 192/8 R |
| 3,789,740 | 2/1974 | Boyer | 91/486 |
| 3,900,232 | 8/1975 | Rode | 389/517 |
| 4,085,984 | 4/1978 | Cameron | 384/563 |
| 4,382,399 | 5/1983 | Lotter | 91/499 |
| 4,569,630 | 2/1986 | Eickmann | 91/499 |

FOREIGN PATENT DOCUMENTS

| | | | |
|---|---|---|---|
| 2152309 | 10/1970 | Fed. Rep. of Germany | 384/517 |
| 2151934 | 10/1971 | Fed. Rep. of Germany | 91/499 |

*Primary Examiner*—Richard A. Bertsch
*Assistant Examiner*—Peter Korytnyk
*Attorney, Agent, or Firm*—Ronald P. Kananen

[57] ABSTRACT

A main bearing device for a bent axis type axial piston pump/motor constructed such that respective sums of a thrust load and a radial load, in other words, respective total loads acting on first and second bearings, respectively, disposed in a tandem arrangement in the axial direction of the main bearing device becomes uniform. The main bearing device has a first bearing (8) and a second bearing (9) that are disposed in the tandem arrangement through inner and outer wheel seats (10, 11) and a gap defined within the range of 10 to 30μ is formed between the inner side end surface (12) of the outer race (8b) of the first bearing (8) and the inner side end surface (13) of the outer wheel seat.

2 Claims, 3 Drawing Sheets

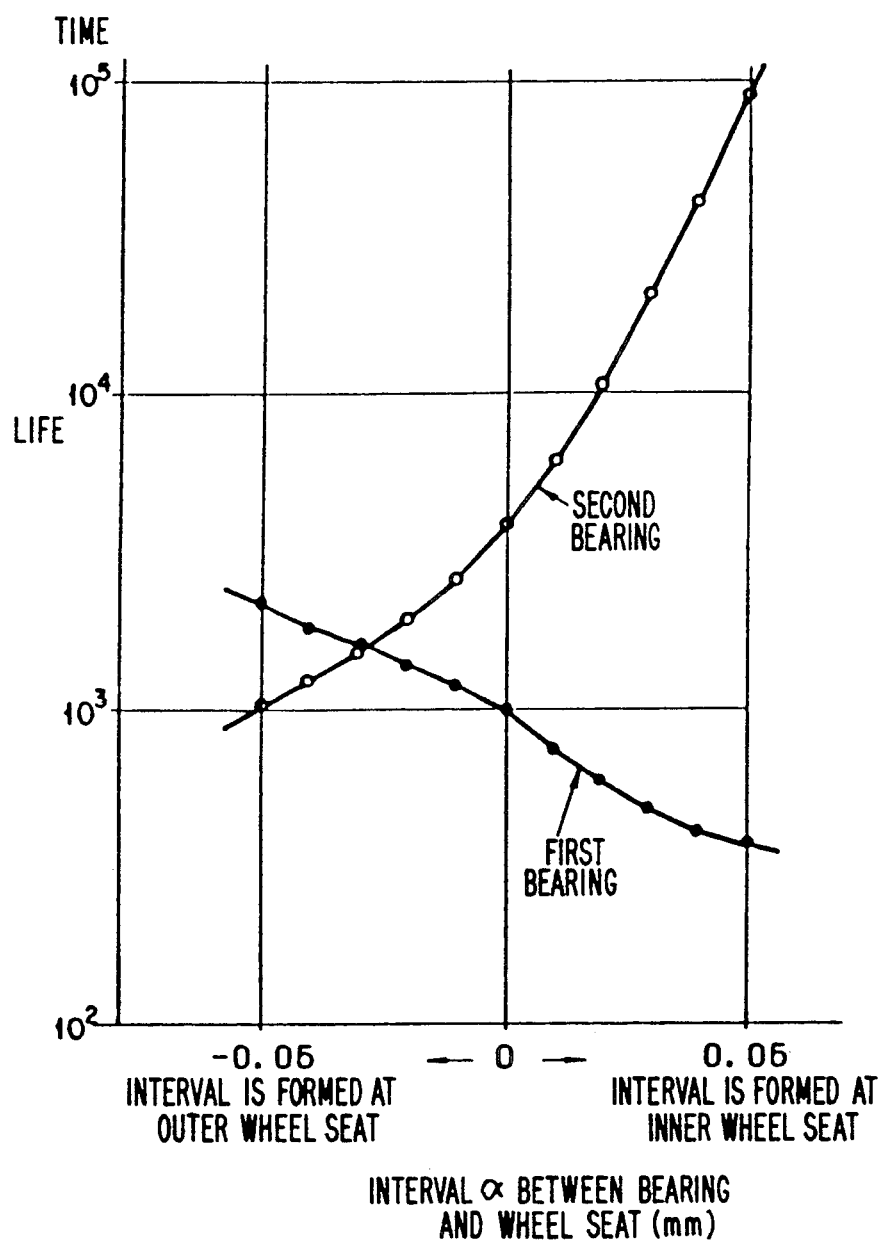

MAIN BEARING DEVICE FOR BENT AXIS TYPE AXIAL PISTON PUMP/MOTOR

TECHNICAL ART FIELD OF THE INVENTION

This invention relates to a main bearing device for a bent axis type axial piston pump/motor by which the main shaft thereof can be rotatingly borne.

BACKGROUND ART OF THE INVENTION

In general, for example, as shown in FIG. 1, a bent axis type axial piston pump/motor has been heretofore constructed such that a shaft 2 is rotatingly borne through a main bearing device 3 to a housing 1, that a central support pintle 5 supported by a cylinder block 4 and tilted at a predetermined tilt angle $\theta$ with respect to the shaft 2 is tiltably connected to the shaft 2, and that pistons 7 slidingly inserted into cylinder holes 6, respectively, of the cylinder block 4 are tiltably connected to the shaft 2.

In such a bent axis type axial piston pump/motor as described above, since the pistons 7 are connected to the shaft 2 at a position where the pistons 7 are offset in the outer peripheral side of the axis of the shaft 2, and further the pistons 7 are tilted with respect to the axis of the shaft 2, the pistons 7 are thrusted against the shaft 2 by a force $F_1$ in the direction shown by an arrow due to a hydraulic pressure within the cylinder holes 6. As a result, a thrust load and a radial load are acted on the shaft 2.

Therefore, the main bearing device 3 is constructed such that first and second bearings 8 and 9 of a conical roller type are disposed in a tandem arrangement, and that both the thrust load and the radial load can be received continuously by connecting inner races 8a, 9a of the first and the second bearings 8, 9 and outer races 8b, 9b of the first and the second bearings 8, 9 through an inner wheel seat 10 and an outer wheel seat 11, respectively.

In such a main bearing device 3 as described above, the thrust load Fa equally acting to the first and the second bearings 8, 9 as indicated by an arrow of perforated line in FIG. 2, but the radial load $Fr_1$ acting on the first bearing 8 becomes greater than the radial load $Fr_2$ acting on the second bearing 9, because the radial loads are acting tiltingly on positions, respectively, which are offset from the axis of each roller.

Therefore, the total load acting on the first bearing 8 becomes greater than that acting on the second bearing 9. As a result, the life of the first bearing becomes shorter, and hence the life of the main bearing device becomes shorter.

SUMMARY OF THE INVENTION

The present invention has been made in view of the above-mentioned circumstances, and has for its aim to provide a main bearing device for a bent axis type axial piston pump/motor in which the sum the thrust loads and the radial loads acting on a first bearing and a second bearing, respectively, disposed in a tandem arrangement in the axial direction of the main bearing device, that is, the respective total loads act equally on the first and the second bearings.

In order to achieve the above-described aim, according to a main aspect of the present invention, there is provided a main bearing device for a bent axis type axial piston pump/motor having a main shaft rotatably arranged within a housing thereof; a cylinder block connected through a tiltable central support pintle to a proximal end of the main shaft at a predetermined tilt angle with respect to the main shaft; and a plurality of tiltable pistons slidingly inserted into a plurality of cylinder holes formed in the cylinder block so as to extend in the axial direction thereof, respectively, their respective leading ends being connected to the proximal end of the main shaft; the main bearing device comprising a first bearing and a second bearing, wherein in order to bear the main shaft rotatably within the housing, these first and second bearings are disposed in a tandem arrangement in the axial direction of the main bearing device between the housing and the main shaft through inner and outer wheel seats provided between the first and the second bearings, and the main bearing device being characterized in that a gap is defined between the inner side end surface of the outer race of the first bearing and the inner side end surface of the outer wheel seat.

In order to achieve the above-described aim, according to another aspect of the present invention, there is provided a main bearing device for a bent axis type axial piston pump/motor characterized in that the gap set forth in the above-mentioned main aspect is defined within the range of 10 to 30$\mu$.

As is clearly understood from the foregoing description, it is an advantage of the present invention having the above-mentioned aspect that the life of the main bearing device as a whole can last for a longer time, because the respective sums, that is, the respective total loads of the thrust load and the radial load acting on the first bearing and of those acting on the second bearing are kept in equal to each other.

It can be possible for anyone skilled in the art to understand the above and other object, features and advantages of the present invention under the fact that those are manifested with reference to the following detailed description and accompanying drawings in which preferred structural embodiments incorporating the principles of the present invention are shown by way of illustrative example.

BRIEF DESCRIPTION OF THE DRAWINGS

FIG. 4 is a graph showing the relationship between respective lives of a first bearing and a second bearing and an interval of gap formed at an outer wheel seat.

DETAILED DESCRIPTION OF THE PREFERRED EMBODIMENTS

Hereinafter, some of preferred embodiments of the present invention are explained in detail with reference to FIGS. 3 to 5.

But, since the structure of a general bent axis type axial piston pump/motor is as described hereinabove and moreover generally well known, the description thereof is omitted here.

Figure 1:
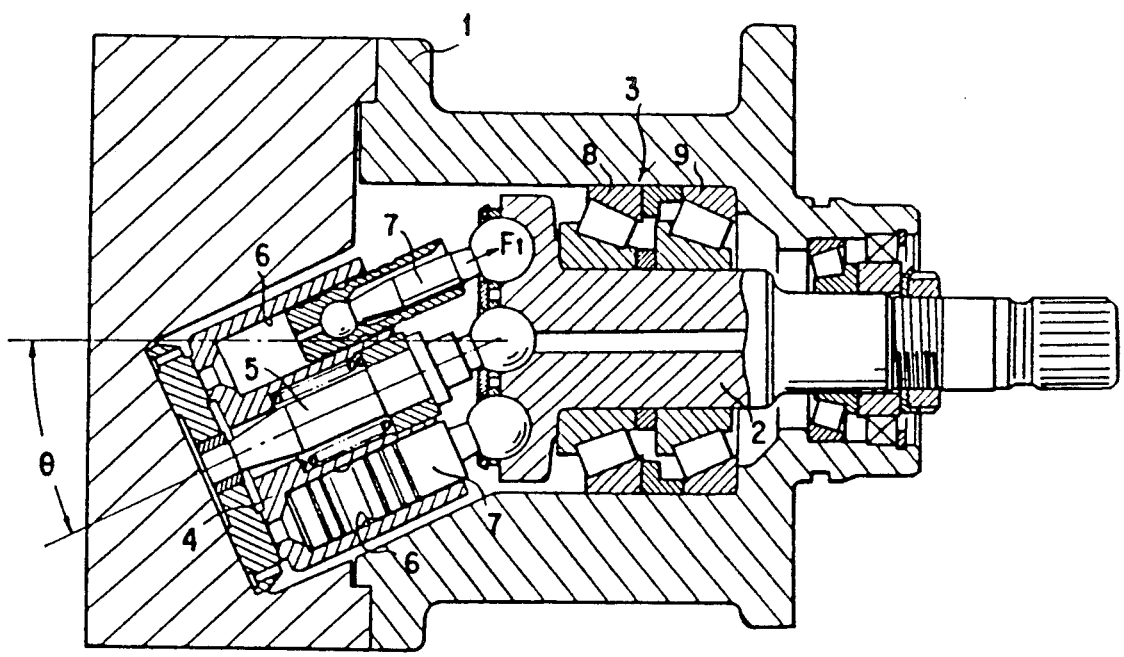
FIG. 1 is a schematic, entirely sectional view of the prior art bent axis type axial piston pump/motor.
Figure 2:
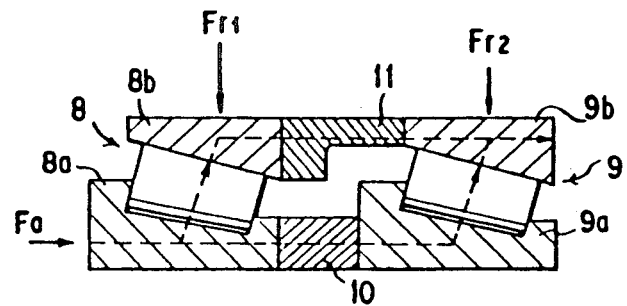
FIG. 2 is a partial sectional view of the prior art main bearing device.
Figure 3:
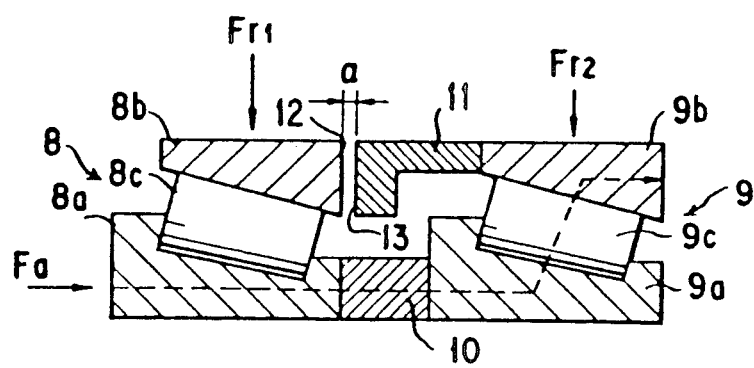
FIG. 3 is a partial sectional view of an embodiment of the present invention.

As shown in FIG. 3, a gap $\alpha$ is defined between the inner side end surface 12 of an outer race 8b of a first bearing 8 and the inner side end surface 13 of an outer wheel seat 11. An interval of the gap α is set within the range of 10 to 30μ, but it is varied according to a hydraulic pressure applied to a piston 7.

By defining thus, since in the initial stages a thrust load Fa is transmitted from an inner race 8a of the first bearing 8 to an outer race 9b of a second bearing 9 via, in turn, an inner wheel seat 10, an inner race 9a of the second bearing 9 and a conical roller 9c as indicated by an arrow of perforated line in FIG. 3, the thrust load does not act on a conical roller 8c of the first bearing 8. In the meantime, when the thrust load Fa is increased to a certain degree, the inner race 9a and the outer race 9b are moved in the axial direction thereof so that the inner side end surface 12 of the outer race 8b of the first bearing 8 is allowed to pressurizedly abut against the inner side end surface 13 of the outer wheel seat 11. As a result, the thrust load acts on the conical roller 8c also.

Stating brief, since the thrust load acts on the first bearing 8 after a certain degree of the thrust load acts on the second bearing 9 as a previous load, the thrust load acting on the first bearing 8 is decreased less than that acting on the second bearing 9 by an amount of the previous load.

Therefore, even if respective magnitudes of radial loads $Fr_1$ and $Fr_2$ acting on the first bearing and the second bearing, respectively, are different from each other, it can be possible to equalize respective total loads acting on the first bearing 8 and the second bearing 9, respectively, to each other.

FIG. 4 is a graph showing the relationship between an interval α of gap formed at the outer wheel seat of the main bearing device shown in FIG. 3 and the load acted on the bearings (lives of the bearings) which is obtained by a simulation calculation with using a computer while taking the main shaft bearing structure of a bent axis type axial piston pump/motor and the axial rigidity into consideration. It is clearly understood from the graph that respective total loads acting on the first and the second bearings 8, 9, respectively can be equal to each other, thereby extending the total life of the main bearing device to the maximum extent.

Figure 5:
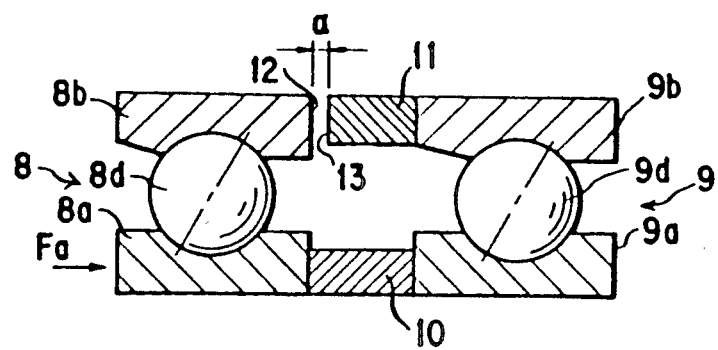
FIG. 5 is a partial sectional view of another embodiment of the present invention.

Further, as shown in FIG. 5, it has been clear that the same results as described above are also obtained in angular-contact type bearings in which balls 8d, 9d are used in the first and the second bearings 8, 9.

We claim:

1. A main bearing device for a bent axis type axial piston pump/motor having a main shaft rotatably arranged within a housing thereof; a cylinder block connected through a tiltable central support pintle to a proximal end of the main shaft at a predetermined tilt angle with respect to the main shaft; and a plurality of tiltable pistons slidingly inserted into a plurality of cylinder holes formed in the cylinder block so as to extend in the axial direction thereof, their respective leading ends being connected to the proximal end of the main shaft; said main bearing device comprising a first bearing and a second bearing, wherein in order to bear the main shaft rotatably within the housing, these first and second bearings are disposed in a tandem arrangement in the axial direction of the main bearing device between the housing and the main shaft through inner and outer wheel seats provided between the first and the second bearings, and said main bearing device being characterized in that a gap is defined between the inner side end surface of the outer race of the first bearing and the inner side end surface of the outer wheel seat.

2. A main bearing device for a bent axis type axial piston pump/motor as set forth in claim 1 wherein it is characterized in that said gap is defined within the range of 10 to 30μ.

* * * * *

UNITED STATES PATENT AND TRADEMARK OFFICE
CERTIFICATE OF CORRECTION

PATENT NO. : 5,165,321
DATED : November 24, 1992
INVENTOR(S) : Takeo Arimoto, Takashi Ogata, and Kazuyoshi Nagahara It is certified that error appears in the above-indentified patent and that said Letters Patent is hereby corrected as shown below:

Item

-- [73] Assignee:  Kabushiki Kaisha Komatsu
Seisakusho, JAPAN

NTN Corporation,
JAPAN --

Signed and Sealed this

Seventeenth Day of June, 1997

Attest:

BRUCE LEHMAN

Attesting Officer

Commissioner of Patents and Trademarks